US009729286B2

United States Patent
Lee et al.

(10) Patent No.: US 9,729,286 B2
(45) Date of Patent: Aug. 8, 2017

(54) DATA TRANSMISSION AND FEEDBACK METHODS, DEVICES AND SYSTEM

(71) Applicant: INDUSTRIAL TECHNOLOGY RESEARCH INSTITUTE, Hsinchu (TW)

(72) Inventors: Chia-Han Lee, Taipei (TW); Keng-Te Liao, New Taipei (TW); Tzu-Ming Lin, Zhubei (TW); Chien-Min Lee, New Taipei (TW); Jung-Mao Lin, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 240 days.

(21) Appl. No.: 14/543,196

(22) Filed: Nov. 17, 2014

(65) Prior Publication Data
US 2015/0207592 A1  Jul. 23, 2015

Related U.S. Application Data

(60) Provisional application No. 61/928,426, filed on Jan. 17, 2014.

(51) Int. Cl.
*H04L 1/08* (2006.01)
*H04L 5/00* (2006.01)
*H04L 1/18* (2006.01)

(52) U.S. Cl.
CPC .......... *H04L 5/0044* (2013.01); *H04L 1/1893* (2013.01)

(58) Field of Classification Search
CPC .......................... H04L 5/0044; H04L 1/1893
See application file for complete search history.

(56) References Cited

U.S. PATENT DOCUMENTS

| 5,936,962 | A   | * | 8/1999  | Haddock ............ H04L 12/2602 370/446 |
| 6,609,167 | B1  | * | 8/2003  | Bastiani ............. G06F 13/4291 710/10 |
| 8,320,948 | B2  |   | 11/2012 | Li et al.                              |
| 8,472,520 | B2  |   | 6/2013  | Banerjee                               |
| 2009/0175162 | A1 |  | 7/2009  | Monogioudis et al.                     |

(Continued)

FOREIGN PATENT DOCUMENTS

| CN | 101030937 A | 9/2007 |
| CN | 101521625 B | 4/2011 |

(Continued)

OTHER PUBLICATIONS

English Translation of Taiwanese Office Action and Search Report, dated Jan. 27, 2016, for Taiwanese Application No. 103145203.*

(Continued)

*Primary Examiner* — Omar Ghowrwal
(74) *Attorney, Agent, or Firm* — Birch, Stewart, Kolasch & Birch, LLP (57) ABSTRACT

A data transmission method of a device comprises the following steps: transmitting a data to another device; receiving a feedback information from the another device; and when the feedback information indicates a transmission error of the device occurs, determining whether to perform retransmission according to the feedback information.

33 Claims, 5 Drawing Sheets

(56) References Cited

U.S. PATENT DOCUMENTS

| | | | |
|---|---|---|---|
| 2010/0046396 A1* | 2/2010 | Cai | H04W 24/02 370/254 |
| 2010/0188971 A1* | 7/2010 | Chiang | H04L 12/2834 370/225 |
| 2010/0248769 A1 | 9/2010 | Li et al. | |
| 2011/0219281 A1 | 9/2011 | Wang et al. | |
| 2011/0310853 A1* | 12/2011 | Yin | H04L 1/0009 370/335 |
| 2012/0147822 A1 | 6/2012 | Deb et al. | |
| 2012/0263118 A1* | 10/2012 | Love | H04W 72/1215 370/329 |
| 2013/0029716 A1 | 1/2013 | Lee et al. | |
| 2014/0177550 A1 | 6/2014 | Liao et al. | |

FOREIGN PATENT DOCUMENTS

| | | |
|---|---|---|
| CN | 102098139 A | 6/2011 |
| WO | WO 00/70813 A1 | 11/2000 |
| WO | WO 2008/124984 A1 | 10/2008 |
| WO | WO 2009/084927 A1 | 7/2009 |

OTHER PUBLICATIONS

Taiwanese Office Action and Search Report, dated Jan. 27, 2016, for Taiwanese Application No. 103145203.

3GPP TR 37.868 V11.0.0 (Sep. 2011); 3rd Generation Partnership Project;Technical Specification Group Radio Access Network;Study on RAN Improvements for Machine-type Communications (Release 11), pp. 1-28.

3GPP TS 36.211 V11.2.0 (Feb. 2013); 3rd Generation Partnership Project; Technical Specification Group Radio Access Network; Evolved Universal Terrestrial Radio Access (E-UTRA); Physical Channels and Modulation (Release 11), pp. 1-109.

3GPP TS 36.212 V11.2.0 (Feb. 2013); 3rd Generation Partnership Project; Technical Specification Group Radio Access Network; Evolved Universal Terrestrial Radio Access (E-UTRA); Multiplexing and channel coding (Release 11), pp. 1-82.

3GPP TS 36.321 V11.2.0 (Mar. 2013); 3rd Generation Partnership Project; Technical Specification Group Radio Access Network; Evolved Universal Terrestrial Radio Access (E-UTRA); Medium Access Control (MAC) protocol specification (Release 11), pp. 1-56.

Alapati et al., "Back-off and Retransmission Strategies for throughput enhancement of Broadcast transmissions in 802.11p", 2010 IEEE Intelligent Vehicles Symposium, University of California, San Diego, CA, USA, Jun. 21-24, 2010, pp. 700-705.

Ali et al., "Adaptive Retransmission and Error Control in DS-CDMA Random Access Networks", IEEE Communications Society, Globecom 2004, pp. 2654-2658.

Cocco et al., "Collision Resolution in Slotted ALOHA with Multi-User Physical-Layer Network Coding", IEEE, Vehicular Technology Conference (VTC Spring), 2011, 4 pages.

Goseling et al., "Random Access with Physical-layer Network Coding", IEEE, Information Theory and Applications Workshop (ITA), 2013, 7 pages.

Jung et al., "Machine-Type-Communication (MTC) Device Grouping Algorithm for Congestion Avoidance of MTC Oriented LTE Network", Security-Enriched Urban Computing and Smart Grid Communications in Computer and Information Science, vol. 78, 2010, pp. 167-178.

Nakamura et al., "Access Control Method with Variable Retransmission Probability in Ad-Hoc Networks", 2004 IEEE International Conference on Multimedia and Expo (ICME), vol. 3, Jun. 27-30, 2004, pp. 2095-2098.

Osada et al., "Non-orthogonal Access Scheme over Multiple Channels with Iterative Interference Cancellation and Fractional Sampling in OFDM Receiver", IEEE, Vehicular Technology Conference (VTC Spring), May 6-9, 2012, pp. 1-5.

Schaepperle, Joerg, "Throughput of a Wireless Cell Using Superposition Based Multiple-Access with Optimized Scheduling", 2010 IEEE 21st International Symposium on Personal Indoor and Mobile Radio Communications, Sep. 26-30, 2010, pp. 212-217.

Taiwanese Office Action and Search Report for Taiwanese Application No. 103145203, dated Nov. 25, 2016.

* cited by examiner

DATA TRANSMISSION AND FEEDBACK METHODS, DEVICES AND SYSTEM

This application claims the benefit of U.S. provisional application Ser. No. 61/928,426, filed Jan. 17, 2014, the disclosure of which is incorporated by reference herein in its entirety.

TECHNICAL FIELD

The disclosure relates in general to data transmission method, device and system.

BACKGROUND

With the progress in machine type communication (MTC), large numbers of MTC devices with small data transmission are used in various applications.

In Long Term Evolution (LTE) technology, a user equipment (UE) needs to perform a four-step random access procedure before data transmission. We applied contention-based non-orthogonal transmission to reduce the latency. This scheme allows devices to directly transmit data on the randomly selected resources. However, if the number of UE is large, data transmission may result in frequent collisions that deteriorate the system performance. Even worse, the retransmitted data may collide again with each other or with other newly transmitted data.

SUMMARY

The disclosure is directed to data transmission method, device and system.

According to one embodiment, a data transmission method of a device is provided. The data transmission method comprises the following steps: transmitting a data to another device; receiving a feedback information from the another device; and when the feedback information indicates a transmission error of the device occurs, determining whether to perform retransmission according to the feedback information.

According to another embodiment, a device for data transmission is provided. The device comprises a transmission unit and a processing unit. The transmission unit is configured to transmit a data to another device. The processing unit is configured to determine whether to perform retransmission according to a feedback information received from the another device when the feedback information indicates a transmission error of the device occurs.

According to yet another embodiment, a data transmission method of a device is provided. The data transmission method comprises the following steps: receiving a data from another device; sending a feedback information to the another device in response to the data received from the another device; and when the feedback information indicates a transmission error of the another device occurs and the another device decides not to perform retransmission, decoding the data without a retransmitted data of the another device.

According to yet another embodiment, a device for data transmission is provided. The device comprises a detection unit and a feedback information unit. The detection unit is configured to receive a data from another device. The feedback information unit is configured to send a feedback information to the another device in response to the data received from the another device, wherein when the feedback information indicates a transmission error of the another device occurs and the another device decides not to perform retransmission, the detection unit decodes the data without a retransmitted data of the another device.

According to yet another embodiment, a system for data transmission is provided. The system comprises a first device and a second device configured to send a feedback information to the first device in response to data received from the first device, wherein when the feedback information indicates a transmission error of the first device occurs, the first device determines whether to perform retransmission according to the feedback information.

The above and other aspects of the disclosure will become better understood with regard to the following detailed description of the non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and other devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1A:
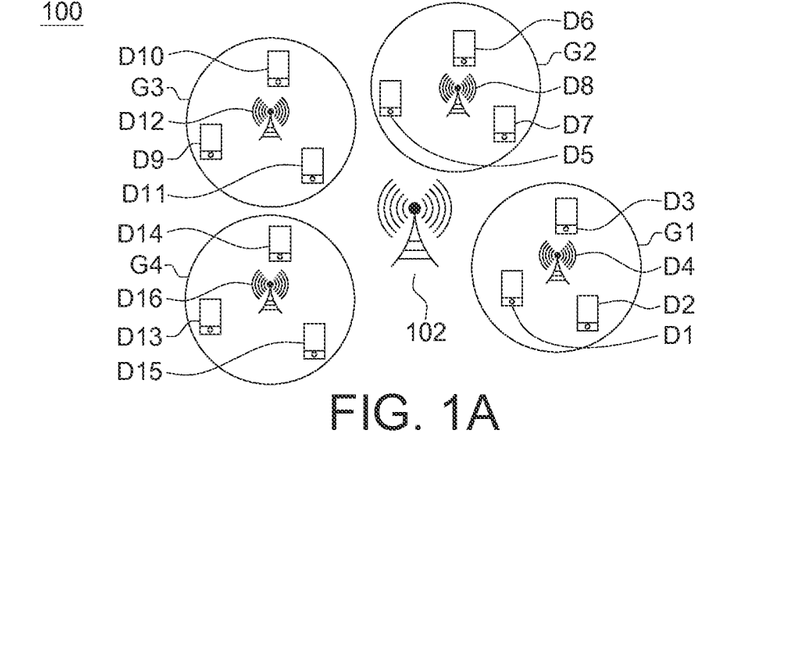
FIG. 1A shows a system for data transmission according to an embodiment of the present disclosure.
Figure 1B:
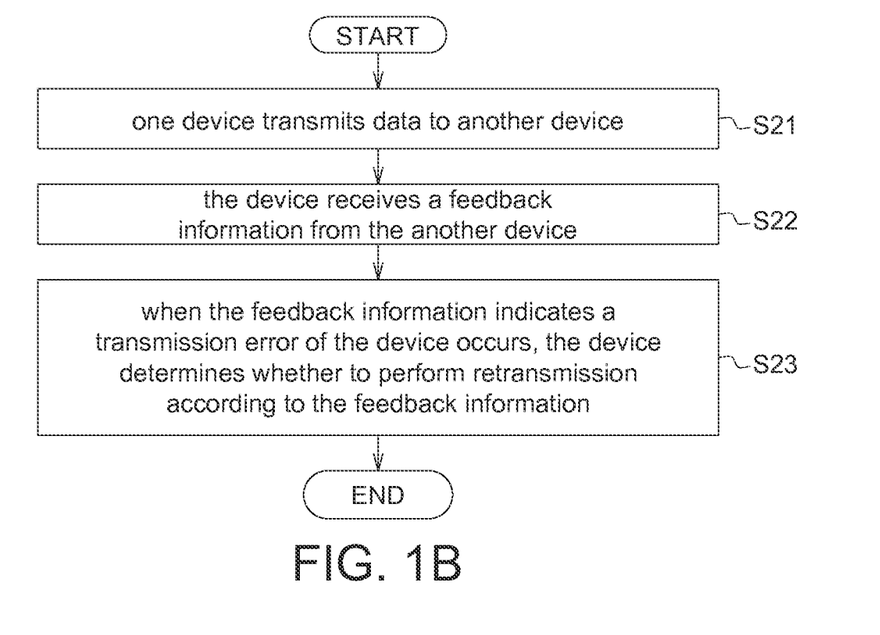
FIG. 1B illustrates a data transmission method of a device of the data transmission system.

Referring to FIGS. 1A and 1B, FIG. 1A illustrates a data transmission system 100 according to an embodiment of the present disclosure. FIG. 1B illustrates a data transmission method of a device of the data transmission system 100. The system 100 comprises a control node 102 and a plurality of devices D1-D16. The control node 102 can be an eNB or other type of base station. The devices D1-D16 can be user equipments (UEs) or machine type communication (MTC) devices such as mobile phones, personal digital assistants (PDAs), laptops, personal computers (PCs), servers, relays, sensors or other type of devices capable of performing data transmission. It is understood that the number of control node and devices is not limited to that shown in FIG. 1A, and may be more or less according to actual demands.

At step S21, one device transmits data to another device. At step S22, the device receives a feedback information from the another device. At step S23, when the feedback information indicates a transmission error of the device occurs, the device determines whether to perform retransmission according to the feedback information.

Specifically, in the system 100, one device may transmit a data to another device. When receiving, from the another device, feedback information indicating a transmission error of the device occurs, the device may determine whether to perform retransmission according to the feedback information. If the device decides not to perform retransmission, the another device may decode the received data without a retransmitted data of the device.

In the example of FIG. 1A, the control node 102 may broadcast group formation information to the devices D1-D16 to form a plurality of groups G1-G4. In each group G1-G4, at least one device is selected to be an aggregator (AG) for forwarding the aggregated data of the located group to the control node 102, while the other devices in the same group are called group members (GMs). As shown in FIG. 1A, devices D4, D8, D12 and D16 are AGs of the groups G1, G2, G3 and G4, respectively, devices D1-D3 are GMs of the group G1, devices D5-D7 are GMs of the group G2, devices D9-D11 are GMs of the group G3, and devices D13-D15 are GMs of the group G4. It is noted that the number of the groups and the devices in each group is not limited to that shown in FIG. 1A. It is just given for illustration purposes, not for restriction purposes.

Figure 1C:
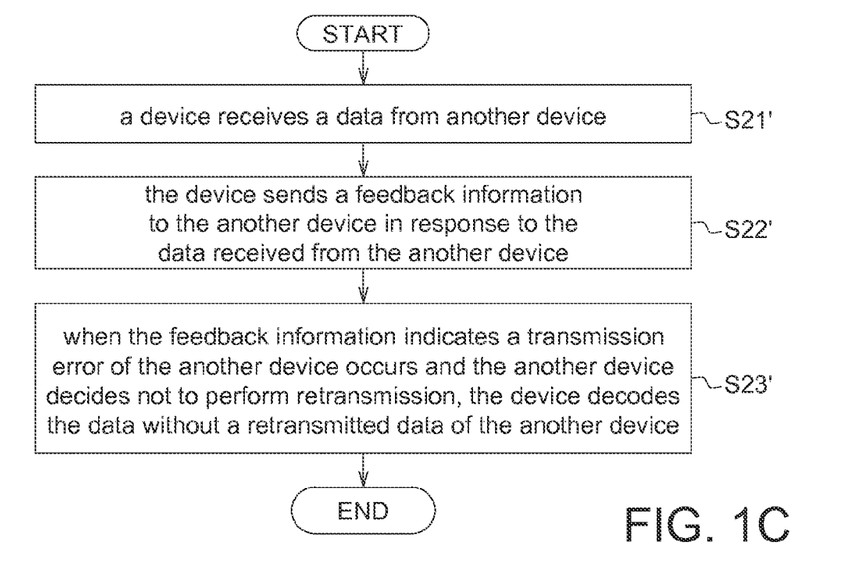
FIG. 1C illustrates a data transmission method of a device being an AG of the data transmission system.

Referring to FIG. 1C, for a device being an AG, the device receives a data from another device (e.g, a GM) at step S21'. Then, at step S22', the device sends a feedback information to the another device in response to the data received from the another device. Next, at step S23', when the feedback information indicates a transmission error of the another device occurs and the another device decides not to perform retransmission, the device decodes the data without a retransmitted data of the another device.

In some embodiments, once the groups G1-G4 are formed, the control node 102 may broadcast group configuration messages which include the resource for data transmission of the GMs and AGs. Then, the GMs can communicate with the control node 102 via the AG located in the same group. Due to the grouping mechanism, data of the GMs can be relayed by the AG to the control node 102. Thus, data congestion can be reduced.

In the embodiment, contention-based non-orthogonal data transmission to the AG is performed. When data collision happens and decoding fails (i.e., data transmission error occurs), retransmission of the GMs can be done through probabilistic retransmission or directly designated by the AG. For example, when data sent by the GMs D1-D3 collide, the GMs D1-D3 may decide whether to perform retransmission according to the respective retransmission probability or the instruction of the AG D4. By doing this, the number of GMs performing retransmission can be reduced and the data collisions caused by retransmissions of the GMs can be reduced.

Figure 2:
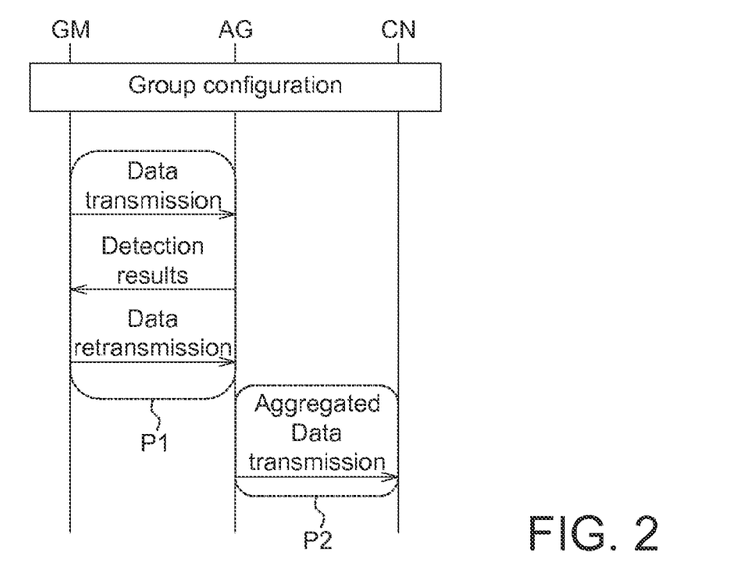
FIG. 2 shows an overview of the data transmission mechanism of the system according to an embodiment of the present disclosure.

FIG. 2 illustrates an overview of the data transmission mechanism of the system 100 according to an embodiment of the present disclosure. As shown in FIG. 2, the uplink transmission has two phases P1 and P2. The first phase P1 is the GM-to-AG transmission. The GMs transmit data on the randomly selected resources to the AG, and then the AG broadcasts decoding results to the GMs. After that, the GMs select the resources for retransmission according the feedback information sent from AG. The second phase P2 is the AG-to-CN (control node) transmission in which the AG forwards the aggregated data to control node 102. In the embodiment, a signal for resource request such as preamble transmission and scheduling request can be removed to reduce access latency. As shown in FIG. 2, a signal for resource request is not transmitted by the GMs before transmitting data.

Figure 3:
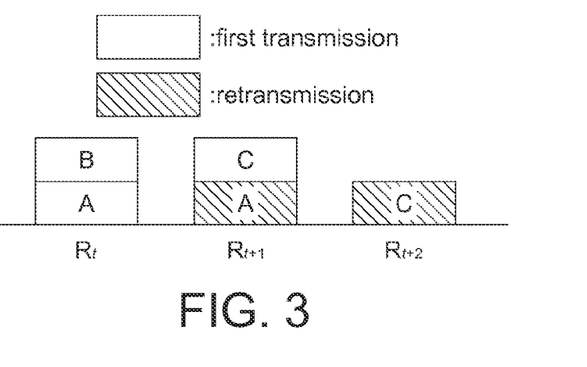
FIG. 3 shows an example of the received data of the AG at different time intervals.

FIG. 3 shows an example of the received data of the AG at different time intervals. Blocks labeled "A", "B" and "C" are received data from GMs a, b and c, respectively. In the example of FIG. 3, data A and data B collide at time t. The retransmitted data A (shaded block) received from the GM a and the newly transmitted data C received from the GM c collide at time t+1. Then, the AG receives a retransmitted data C of the GM c at time t+2.

The received data of the AG can be written in the matrix form:

$$\begin{bmatrix} R_t \\ R_{t+1} \\ R_{t+2} \end{bmatrix} = \begin{bmatrix} h_a(t) & h_b(t) & 0 \\ h_a(t+1) & 0 & h_c(t+1) \\ 0 & 0 & h_c(t+2) \end{bmatrix} \begin{bmatrix} A \\ B \\ C \end{bmatrix} = H \begin{bmatrix} A \\ B \\ C \end{bmatrix} \quad (1)$$

where $R_t$, $R_{t+1}$ and $R_{t+2}$ are received data at time indexes t, t+1 and t+2, respectively; $h_a(t)$, $h_b(t)$ and $h_c(t)$ are the channel coefficients of the GMs a, b and c at time t, respectively; H is the equivalent channel matrix. The noise term is omitted herein for simplification.

In the embodiment, the transmitted data, the newly transmitted data, and the retransmitted data can be detected jointly by the AG. As long as the equivalent channel coefficient H is full rank, the equation (1) can be solved (i.e., a unique answer of data A, B and C is given).

Taking both the simultaneous equations (2) and (3) for example, $$\begin{cases} 2x + y = 3 \\ x - y = 6 \end{cases} \quad (2)$$

and $$\begin{cases} 2x + y = 3 \\ x = 3 \end{cases} \quad (3)$$

are solvable and yield the same result. If the simultaneous equation (3) is considered as the result of retransmission, it means that under the framework of joint detection, not every collided GM needs to perform retransmission (in the equation x=3, the coefficient of y is 0), and the AG can decode the received data even though not all collided data are retransmitted.

Figure 4:
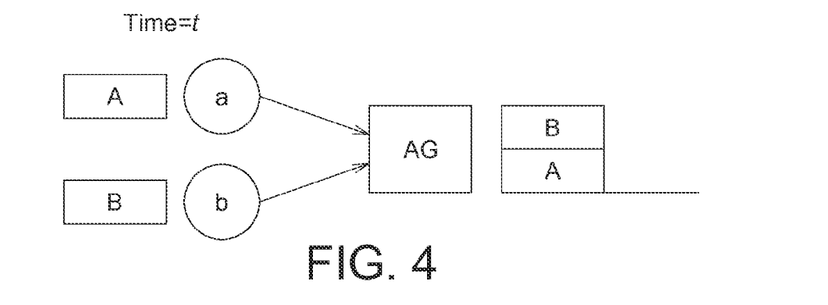
FIG. 4 data A and B collide at time t.

FIG. 4 shows data A and B collide at time t, where data A and B are sent by the GMs a and b, respectively. For the AG, the received data at time t is $$R_t = h_a(t)A + h_b(t)B + N_t \quad (4)$$

where $h_a(t)$ and $h_b(t)$ are the channel coefficients of the GM a and the GM b, respectively, and $N_t$ is the noise term.

If the AG asks both GMs a and b to perform retransmissions, at time t+1, the AG may receive data $R_{t+1}$ which contains the two retransmitted data:

$$R_{t+1} = h_a(t+1)A + h_b(t+1)B + N_{t+1} \quad (5)$$

Then, data A and B can be decoded by solving the linear equations (4) and (5) (through the MIMO detection method, for example).

On the other hand, if only GM a or GM b retransmits, say GM b retransmits, then the received data $R'_{t+1}$ is $$R'_{t+1} = h_b(t+1)B + N_{t+1} \quad (6)$$

Using the received data $R'_{t+1}$ along with $R_t$, data A and B can also be decoded. That is, with the joint detection, there is no need for retransmitting all the collided data, and the AG can still decode the received data.

The retransmission mechanism can be initiated by the GMs or the AG. If initiated by the GMs, the GMs may perform retransmissions according to a retransmission probability $P_{RT}$, which is determined by a retransmission probability function which may use the feedback information from the AG as the input parameters and vary with transmission status. The feedback information may comprise resource allocation information, data decoding results of the AG for the GMs and the retransmission probability $P_{RT}$ varied with the data decoding results. In an example, the feedback information comprises a first parameter $N_{c,i}(t)$ indicating the number of collided GMs on a resource index i at time index t and a second parameter $N_{f,i}(t)$ indicating the number of failed GMs in the group on the resource index i at time t, where the resource index i may indicate a specific resource block or a resource block group, which will be described later. The GMs may utilize the first and second parameters $N_{c,i}(t)$ and $N_{f,i}(t)$ to calculate the retransmission probability on resource index i at time t $P_{RT,i}(t)$. For example, the retransmission probability function can be as $$P_{RT,i}(t) = 1 - \frac{N_{f,i}(t) - 1}{N_{c,i}(t)}, \ 1 \leq N_{f,i}(t) \leq N_{c,i}(t) \quad (7)$$

The retransmission probability function (7) has two properties. The first property is that if there is only one GM failed, the retransmission probability $P_{RT,i}(t)=1$. The second property is that when the number of failed GMs increases, the value of the retransmission probability $P_{RT,i}(t)$ decreases. Due to the above properties of the retransmission probability function, the collided GMs can properly adjust the value of the respective retransmission probability to avoid data collisions caused by retransmissions. It is noted that the retransmission probability function (7) is just one way of implementing the present disclosure. It is given for illustration purposes, not for restriction purposes.

Figure 5:
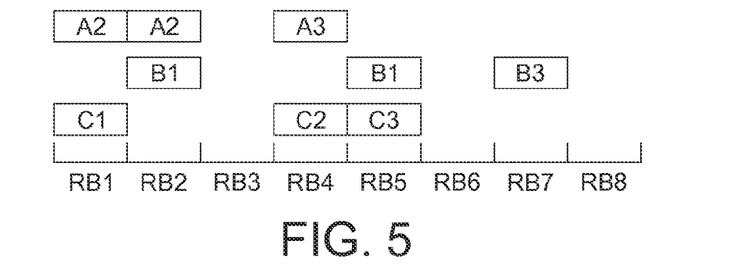
FIG. 5 shows an example of the resource blocks used by the GMs.

FIG. 5 shows an example of resource blocks used by the GMs. In the example of FIG. 5, the GMs a, b and c randomly selects the resource blocks to transmit data. As shown in FIG. 5, the resource blocks RB1, RB2 and RB4 are selected by the GM a to transmit data A1-A3, the resource blocks RB2, RB5 and RB7 are selected by the GM b to transmit data B1-B3, and the resource blocks RB1, RB4 and RB5 are selected by the GM c to transmit data C1-C3. In the embodiment, to reduce the receiver complexity and to control the data collision probability among the GMs, the resource blocks can be grouped into resource block groups.

Figure 6:
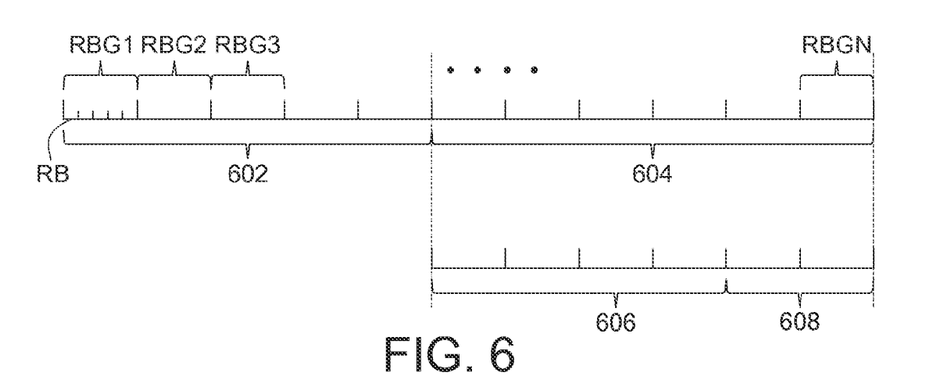
FIG. 6 shows an example of the allocation of the resource block groups.

FIG. 6 shows an example of the allocation of the resource block groups. As shown in FIG. 6, the resource blocks RB are divided into resource block groups RBG1-RBGN. The resource block groups RBG1-RBGN are further divided into two sets: a first resource block group set 602 for new transmission and a second resource block group set 604 for retransmission. The second resource block group set 604 can be further classified according to different types of retransmissions. As shown in FIG. 6, the second resource block group set 604 is further classified into a resource block group set 606 for first retransmission and a resource block group set 608 for second retransmission.

The GM may choose a resource block group randomly from the resource block group sets corresponding to different transmission status. For example, the GM may choose a resource block group from the first resource block group set 602 to perform new transmission. If the GM needs to retransmit data, the GM may choose a resource block group from the second resource block group set 604 to perform retransmission.

For each data transmission of the GM, the number of the resource block group of each resource block group set is dynamically adjusted. The number of resource block groups for qth retransmission at time index t+1 is determined by retransmission probability of the set of resource block groups for q−1th retransmission at time t. For example, the number of the resource block groups for qth retransmission at time t+1 can be represented as $$N_{RBG,q}^{RT}(t+1) = \sum_{i \in R_{t,q-1}} \left[ \sum_{l=1}^{N_{f,i}(t)} \left[ (P_{RT,i}(t))^l (1 - P_{RT,i}(t))^{N_{f,i}(t)-l} \right] \cdot \binom{N_{f,i}(t)}{l} \cdot l \right] \quad (8)$$

where $R_{t,q-1}$ is the set with resource block group indexes for q−1th retransmission at time index t.

The total number of the resource block groups for retransmission is then $$N_{Total}^{RT,RBG} = \sum_{q=1}^{N_{RT,max}} N_{RBG,q}^{RT} \quad (9)$$

where $N_{RT,max}$ is maximum retransmission times.

Figure 7A:
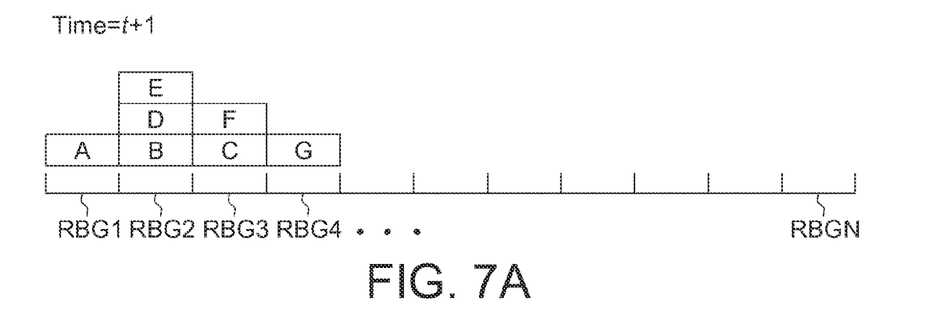
FIG. 7A shows an example of the received data distribution of the AG.
Figure 7B:
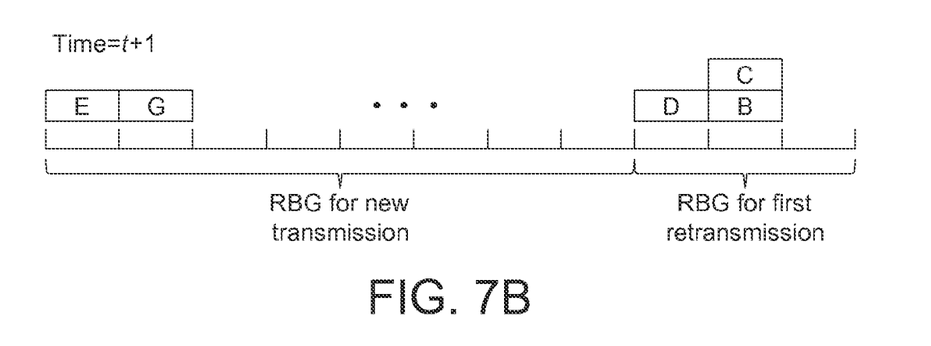
FIG. 7B shows an example of the received data distribution with the retransmitted data.

Refer to FIGS. 7A and 7B. FIG. 7A shows an example of the received data distribution of the AG. FIG. 7B shows an example of the received data distribution with the retransmitted data. In the example of FIGS. 7A and 7B, there are seven GMs indexed by a, b, c, d, e, f, and g accessing the AG, and the data transmitted from each GM is denoted by A, B, C, D, E, F, and G, respectively. Initially, all the available resource block groups RBG1-RBGN are for new transmission, and the GM transmits data on the resource block groups selected randomly. In the example of FIG. 7A, data E, B, and D collide on the resource block group RBG2, and data F and C collide on the resource block group RBG3. If only data E has been decoded successfully, the AG feedbacks the first and second parameters $N_{c,i}$ and $N_{f,i}$, decoding results corresponding to each resource block group, and the new resource allocation derived from the current decoding results. According to equation (9), it can be obtained that the total number of the resource block groups for retransmission is 3. The failed GMs perform retransmission according to the derived retransmission probabilities. As shown in FIG. 7B, at time t+1, the GM e and GM g perform new data transmissions, and the GM b, GM c, and GM d perform first retransmissions. If data B and data C still cannot be decoded successfully, the GM b and GM c will update their retransmission probability according to the decoding results, and the number of resource block groups for second retransmissions will be 1. Moreover, the GMs which do not perform retransmissions may use the previously derived retransmission probability to determine whether to retransmit or not.

Figure 8:
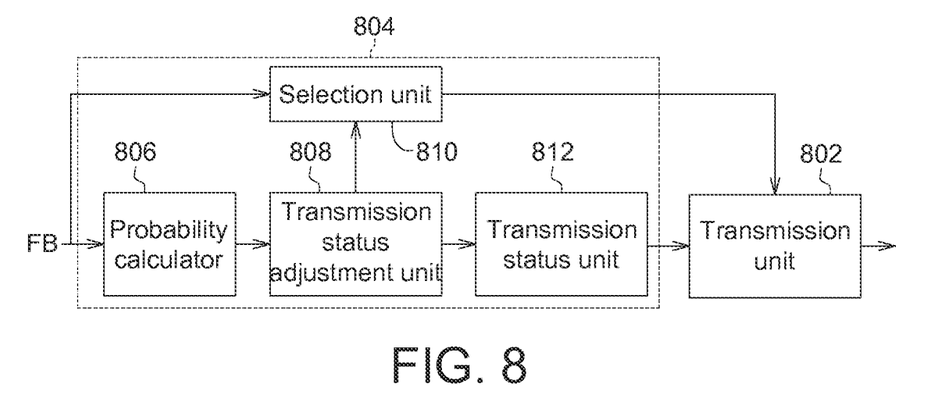
FIG. 8 shows a block diagram of the GM according to an embodiment of the present disclosure.

FIG. 8 shows a block diagram of the GM according to an embodiment of the present disclosure. The GM comprising a transmission unit 802 and a processing unit 804. The transmission unit 802 may transmit data to the AG. The processing unit 804 may determine whether to perform retransmission according to the feedback information FB received from the AG. When the feedback information FB indicates a transmission error of the GM occurs and causing the GM not to perform the retransmission, the AG may decode the data without a retransmitted data of the GM.

In the example of FIG. 8, the processing unit 804 further comprises a probability calculator 806, a transmission status adjustment unit 808, a selection unit 810 and a transmission status unit 812. When the feedback information FB indicates a transmission error of the GM occurs, the probability calculator 806 may calculate a retransmission probability according to the feedback information FB and determine whether to perform the retransmission according to the calculated retransmission probability. The transmission status adjustment unit 808 may adjust the transmission status of the GM according to the feedback information FB. The transmission status comprises a first status for new transmission and a second status for retransmission. When the GM is operated at the first status, the selection unit 810 may choose a resource block group from a resource block group set for new transmission to transmit data. When the GM is operates at the second status, the selection unit 810 may choose a resource block group from a resource block group set for retransmission to transmit retransmitted data. The transmission status unit 812 may output data corresponding to the transmission status. For example, the transmission status unit 812 may output a first data corresponding to the first status or a second data corresponding to the second status to the transmission unit 802. For example, the GM may load the previously transmitted data from a retransmission buffer of the transmission status unit 812 and output the previously transmitted data to the transmission unit 802 if the GM is operated at the second status for retransmission.

Figure 9:
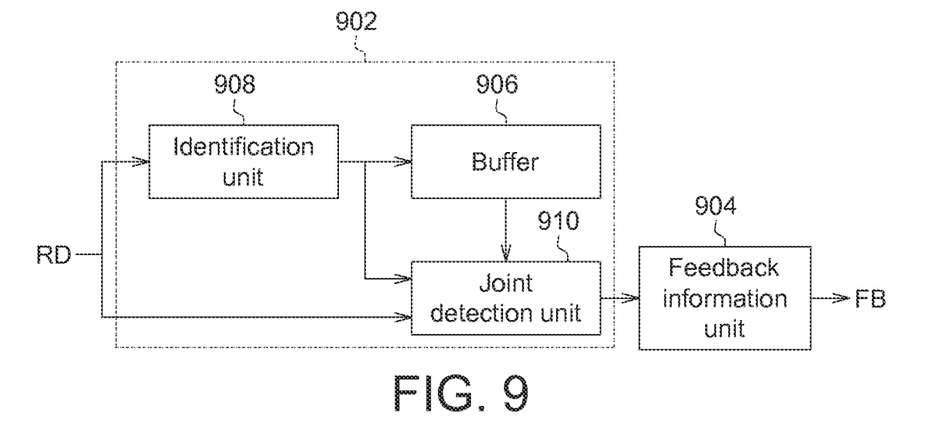
FIG. 9 shows a block diagram of the AG according to an embodiment of the present disclosure.

FIG. 9 shows a block diagram of the AG according to an embodiment of the present disclosure. The AG comprises a detection unit 902 and a feedback information unit 904. The detection unit 902 may receive data RD the GM. In response to the data RD, the feedback information unit 904 sends the feedback information FB to the GM and may cause the GM not to perform retransmission when the feedback information FB indicates a transmission error of the GM occurs. If the GM has a transmission error but does not perform retransmission, the detection unit 902 may still decode the data RD without a retransmitted data of the GM.

In the example of FIG. 9, the detection unit 902 further comprises a buffer 906, an identification unit 908 and a joint detection unit 910. The buffer 906 is configured to store data previously received from the located group. The identification unit 908 is configured to find out active group members of the group in each of the resource block groups. As described above, the resource block groups can be divided into a first resource block group set for new transmission and a second resource block group set for retransmission. For the first resource block group set, the joint detection unit 910 may perform detection on signal currently received from the group, while for the second resource block group set, the joint detection unit 910 may perform joint detection on the signal currently received from the group and one or more signals previously received from the group. Then, the joint detection unit 910 may output the detection result to the feedback information unit 904, and the feedback information unit 904 may update a resource allocation of the resource block groups according to detection results obtained from the joint detection unit 910 and generate the feedback information FB according to the detection results.

In an example, the AG may perform a GM identification process which utilizes the reference signal to find out the active GMs in each resource block group. For the received signal on the resource block group set for new transmissions, the AG performs detection only on the currently received signal. On the other hand, the received signal on the resource block group set for retransmission is jointly detected with the previously received signals. Finally, the AG may broadcast the decoding results and resource allocation information to GMs.

According the abovementioned embodiments, when data collision happens and decoding fails (i.e., data transmission error occurs), not every collided device has to perform retransmission. By using the joint detection, the AG can decode the received data without a retransmitted data from the collided devices. Thus, unnecessary retransmissions can be avoided and the congestion caused by retransmissions can be reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A data transmission method of a device, comprising:
   transmitting a data to another device;
   receiving a feedback information from the another device; and
   when the feedback information indicates a transmission error of the device occurs, determining whether to perform retransmission according to the feedback information;
   wherein when the feedback information indicates the transmission error of the device occurs and the device decides not to perform the retransmission, the another device decodes the data without a retransmitted data of the device,
   wherein said determining whether to perform retransmission further comprises:
   calculating a retransmission probability according to the feedback information; and
   determining whether to perform the retransmission according to the retransmission probability, and
   wherein the device and the another device are in a group comprising a plurality of group members and the device is one of the group members, the feedback information comprises:
   a first parameter indicating a number of collided group members in the group on a resource block group; and
   a second parameter indicating a number of failed group members in the group on the resource block group.

2. The data transmission method according to claim 1, wherein a signal for resource request is not transmitted before transmitting the data.

3. The data transmission method according to claim 1, further comprising:
   receiving a group formation information from a control node to group with the another device; and
   communicating with the control node via the another device.

4. The data transmission method according to claim 1, wherein the feedback information comprises data decoding results for group members, and the retransmission probability is varied with the data decoding results.

5. The data transmission method according to claim 1, further comprising:
   calculating the retransmission probability according to the first and second parameters, wherein when the number of collided group members increases, a value of the retransmission probability decreases.

6. The data transmission method according to claim 1, wherein a plurality of resource blocks are allocated to the device to perform data transmission, the resource blocks are grouped into a plurality of resource block groups, and the resource block groups are divided into a first resource block group set for new transmission and a second resource block group set for retransmission.

7. The data transmission method according to claim 6, further comprising:
   adjusting a transmission status of the device according to the feedback information, wherein the transmission status comprises a first status and a second status;
   when operating at the first status, choosing a resource block group from the first resource block group set to perform new transmission; and
   when operating at the second status, choosing a resource block group from the second resource block group set to perform retransmission.

8. The data transmission method according to claim 6, wherein for each data transmission of the device, a number of the resource block groups of the first resource block group set and a number of the resource block groups of the second resource block group set are dynamically adjusted.

9. The data transmission method according to claim 1, wherein the device is set not to perform the retransmission by the another device when the feedback information indicates the transmission error of the data occurs.

10. A device for data transmission, comprising:
    a transmission circuit configured to transmit a data to another device;
    a processing circuit configured to determine whether to perform retransmission according to a feedback information received from the another device when the feedback information indicates a transmission error of the device occurs; and
    a probability calculator configured to calculate a retransmission probability according to the feedback information and determine whether to perform the retransmission according to the retransmission probability;
    wherein when the feedback information indicates the transmission error of the device occurs and the device decides not to perform the retransmission, the another device decodes the data without a retransmitted data of the device, and
    wherein the device and the another device are in a group comprising a plurality of group members and the device is one of the group members, and the feedback information comprises:
    a first parameter indicating a number of collided group members in the group on a resource block group; and
    a second parameter indicating a number of failed group members in the group on the resource block group.

11. The device according to claim 10, wherein the device does not transmit a signal for resource request before transmitting the data.

12. The device according to claim 10, wherein the processing circuit is further configured to receive a group formation information from a control node to group with the another device so that the device communicates with the control node via the another device.

13. The device according to claim 10, wherein the feedback information comprises data decoding results of group members for determining the retransmission probability.

14. The device according to claim 10, wherein the probability calculator calculates the retransmission probability according to the first and second parameters, when the number of collided group members increases, a value of the retransmission probability decreases.

15. The device according to claim 10, wherein the processing circuit is further configured to use a first resource block group set including a plurality of first resource blocks for new transmission and a second resource block group set including a plurality of second resource blocks for retransmission.

16. The device according to claim 15, wherein the processing circuit is further configured to:
    adjust a transmission status of the device according to the feedback information, wherein the transmission status comprises a first status and a second status;
    choose a resource block group from the first resource block group set to perform new transmission when the device is operated at the first status, and to choose a resource block group from the second resource block group set to perform retransmission when the device is operated at the second status; and
    output data corresponding to the transmission status.

17. The device according to claim 16, wherein the processing circuit is further configured to adjust a number of the resource block groups of the first resource block group set and a number of the resource block groups of the second resource block group set for each data transmission of the device.

18. The device according to claim 10, wherein the processing circuit of the device sets the device not to perform the retransmission in response to the feedback information indicates that the transmission error of the data occurs.

19. A data transmission method of a device, comprising:
    receiving a data from another device;
    sending a feedback information to the another device in response to the data received from the another device; and
    when the feedback information indicates a transmission error of the another device occurs and the another device decides not to perform retransmission, decoding the data without a retransmitted data of the another device,
    wherein a plurality of resource blocks are allocated to the another device to perform data transmission, the resource blocks are grouped into a plurality of resource block groups, and the resource block groups are divided into a first resource block group set for new transmission and a second resource block group set for retransmission, and
    wherein the device and the another device are in a group comprising a plurality of group members and the another device is one of the group members, and the feedback information comprises:
a first parameter indicating a number of collided group members in the group on one of the resource block groups; and
a second parameter indicating a number of failed group members in the group on the one of the resource block groups.

20. The data transmission method according to claim 19, further comprising:
receiving a group formation information from a control node to group with the another device so that the device and the another device are in a group; and
forwarding an aggregated data corresponding to a group to the control node.

21. The data transmission method according to claim 19, further comprising:
finding out active group members of the group in each of the resource block groups;
for the first resource block group set, performing detection on a signal currently received from the group; and
for the second resource block group set, performing joint detection on the signal currently received from the group and one or more signals previously received from the group.

22. The data transmission method according to claim 21, further comprising:
updating a resource allocation of the resource block groups according to detection results of said performing detection and said performing joint detection; and
generating the feedback information according to the detection results.

23. The data transmission method according to claim 19, further comprising:
for each data transmission of the another device, dynamically adjusting a number of the resource block groups of the first resource block group set and a number of the resource block groups of the second resource block group set.

24. The data transmission method according to claim 19, further comprising:
setting the another device not to perform the retransmission when the feedback information indicates the transmission error of the data occurs.

25. A device for data transmission, comprising:
a detection circuit configured to receive a data from another device; and
a feedback information circuit configured to send a feedback information to the another device in response to the data received from the another device, wherein when the feedback information indicates a transmission error of the another device occurs and the another device decides not to perform retransmission, the detection circuit decodes the data without a retransmitted data of the another device,
wherein the another device is configured to use a first resource block group set including a plurality of first resource blocks for new transmission and a second resource block group set including a plurality of second resource blocks for retransmission, and
wherein the device and the another device are in a group comprising a plurality of group members and the another device is one of the group members, and the feedback information comprises:
a first parameter indicating a number of collided group members in the group on one of the resource block groups; and
a second parameter indicating a number of failed group members in the group on the one of the resource block groups.

26. The device according to claim 25, wherein the detection circuit is further configured to receive a group formation information from a control node to group with the another device.

27. The device according to claim 25, wherein the detection circuit is further configured to:
store a signal previously received from the group; and
find out active group members of the group in each of the resource block groups; and
perform detection on a signal currently received from the group for the first resource block group set, and to perform joint detection on the signal currently received from the group and the signal previously received from the group for the second resource block group set.

28. The device according to claim 27, wherein the feedback information circuit is further configured to update a resource allocation of the resource block groups according to detection results obtained from the detection circuit and to generate the feedback information according to the detection results.

29. The device according to claim 25, wherein for each data transmission of the device, the feedback information circuit dynamically adjusts a number of the resource block groups of the first resource block group set and a number of the resource block groups of the second resource block group set.

30. The device according to claim 25, wherein the feedback information circuit is further configured to send the another device the feedback information indicating that the transmission error occurs to set the another device not to perform the retransmission.

31. A data transmission system, comprising:
a first device; and
a second device sending a feedback information to the first device in response to data received from the first device;
wherein when the feedback information indicates a transmission error of the first device occurs, the second device decodes the data without a retransmitted data from the first device, and
wherein the first device is configured to use a first resource block group set including a plurality of first resource blocks for new transmission and a second resource block group set including a plurality of second resource blocks for retransmission, and
wherein the second device and the first device are in a group comprising a plurality of group members and the first device is one of the group members, and the feedback information comprises:
a first parameter indicating a number of collided group members in the group on one of the resource block groups; and
a second parameter indicating a number of failed group members in the group on the one of the resource block groups.

32. The data transmission system according to claim 31 wherein a signal for resource request is not transmitted to the second device before the first device transmits the data.

33. The data transmission system according to claim 31, further comprising:
a base station broadcasting a group formation information to the first and second devices to form the group of the first and second devices.

* * * * *